United States Patent [19]

Bridges et al.

[11] Patent Number: 5,861,956
[45] Date of Patent: Jan. 19, 1999

[54] RETROREFLECTOR FOR USE WITH TOOLING BALL

[75] Inventors: Robert E. Bridges, Kennett Square; Lawrence B. Brown, Cochranville; D. Scott Ackerson, Downingtown, all of Pa.

[73] Assignee: SpatialMetriX Corporation, Kennett Square, Pa.

[21] Appl. No.: 863,939

[22] Filed: May 27, 1997

[51] Int. Cl.⁶ ................................................. G01B 11/14
[52] U.S. Cl. .......................... 356/375; 33/293; 359/529
[58] Field of Search .................... 356/372, 375, 356/376, 358, 363; 33/293, 520, 613, 644, 503, 299; 359/465, 515, 529

[56] References Cited

U.S. PATENT DOCUMENTS

| | | | |
|---|---|---|---|
| 2,904,890 | 9/1959 | Vajda | 33/74 |
| 3,188,739 | 6/1965 | Olsen et al. | 33/74 |
| 3,730,470 | 5/1973 | Mitchell | 248/274 |
| 4,472,054 | 9/1984 | Pouit | 356/363 |
| 4,539,753 | 9/1985 | Fitzpatrick | 33/169 |
| 4,543,729 | 10/1985 | Holbrook | 33/293 |
| 4,589,746 | 5/1986 | Pavone | 356/358 |
| 4,621,926 | 11/1986 | Merry et al. | 356/363 |
| 4,714,339 | 12/1987 | Lau et al. | 356/4.5 |
| 4,790,651 | 12/1988 | Brown et al. | 356/4.5 |
| 4,964,218 | 10/1990 | Morghen | 33/293 |
| 5,007,175 | 4/1991 | Schwarz | 33/286 |
| 5,073,005 | 12/1991 | Hubbs | 359/515 |
| 5,119,564 | 6/1992 | Hamilton et al. | 33/293 |
| 5,123,737 | 6/1992 | Eichweber | 356/152 |
| 5,177,563 | 1/1993 | Everett et al. | 356/375 |
| 5,231,539 | 7/1993 | McMillen | 359/529 |
| 5,305,091 | 4/1994 | Gelbart et al. | 356/375 |
| 5,392,521 | 2/1995 | Allen | 33/293 |
| 5,400,143 | 3/1995 | Bauer | 356/351 |
| 5,428,446 | 6/1995 | Ziegert et al. | 356/358 |
| 5,530,549 | 6/1996 | Brown | 356/376 |

FOREIGN PATENT DOCUMENTS 9535480  12/1995  WIPO .

OTHER PUBLICATIONS

SMX Data Sheet; Document No. 96527, *Typical SMR Nests and Accessories,* two pages, Jan. 1997.
SMX Data sheet; Document No. 97017, Contact Probes and Optical Targets, two pages, Feb. 1997.
Leica Pamphlet, *LT 500/LTD 500, 3D–Laser Tracking System—The Hardware,* six pages, ©1996.

*Primary Examiner*—Hoa Q. Pham
*Attorney, Agent, or Firm*—Roylance,Abrams,Berdo & Goodman, L.L.P.

[57] ABSTRACT

A measuring apparatus for determining the location of a point in space using a coordinate measuring machine, such as a laser tracker. The apparatus comprises a retroreflector releasably coupled to a sphere of a tooling ball. The tooling ball is rigidly coupled to a mechanism whose position is to be found and whose movements can be monitored by repeatedly determining the position of the center point of the sphere of the tooling ball. The retroreflector is formed of solid glass and has a corner cube having a vertex which has a predetermined dimensional relationship with and represents the virtual location of the point in space, that is, the center point of the sphere. The retroreflector is configured to receive a beam of light from the laser tracker and then reflect and retroreflect the beam to the laser tracker to determine the location of the vertex of the corner cube and, thus, the center of the tooling ball. The retroreflector is movable along the outer surface of the sphere of the tooling ball and maintains the various positions to which it is moved in a free-standing manner without any external assistance or support. Additionally, the retroreflector is easily removed from the tooling ball and placed on the same or other tooling balls.

22 Claims, 5 Drawing Sheets

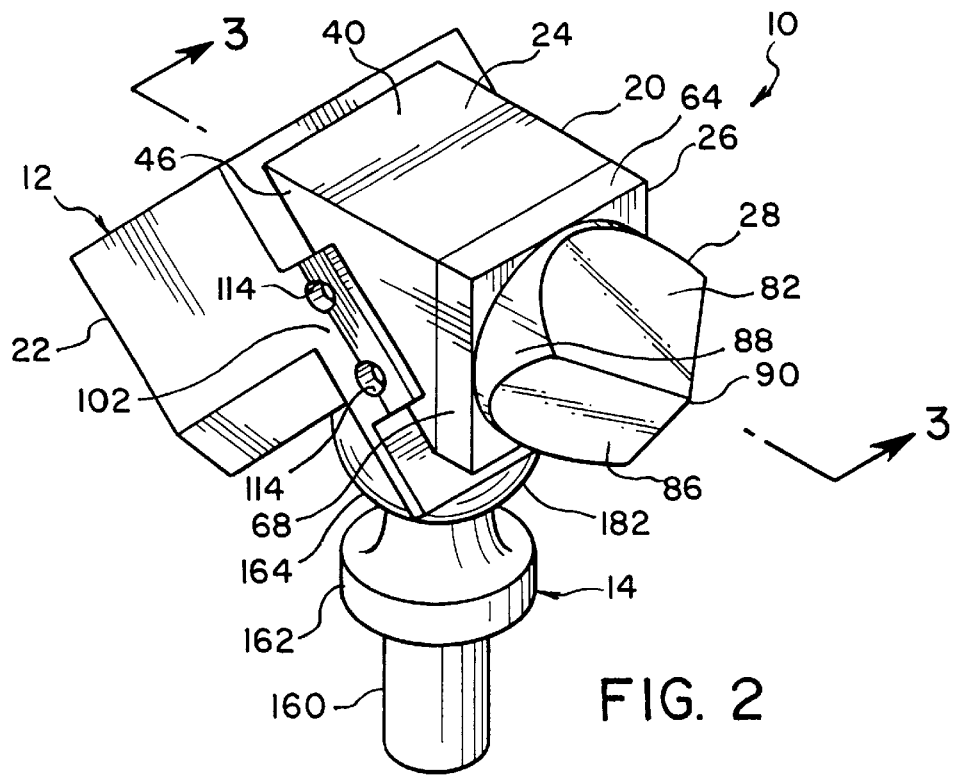
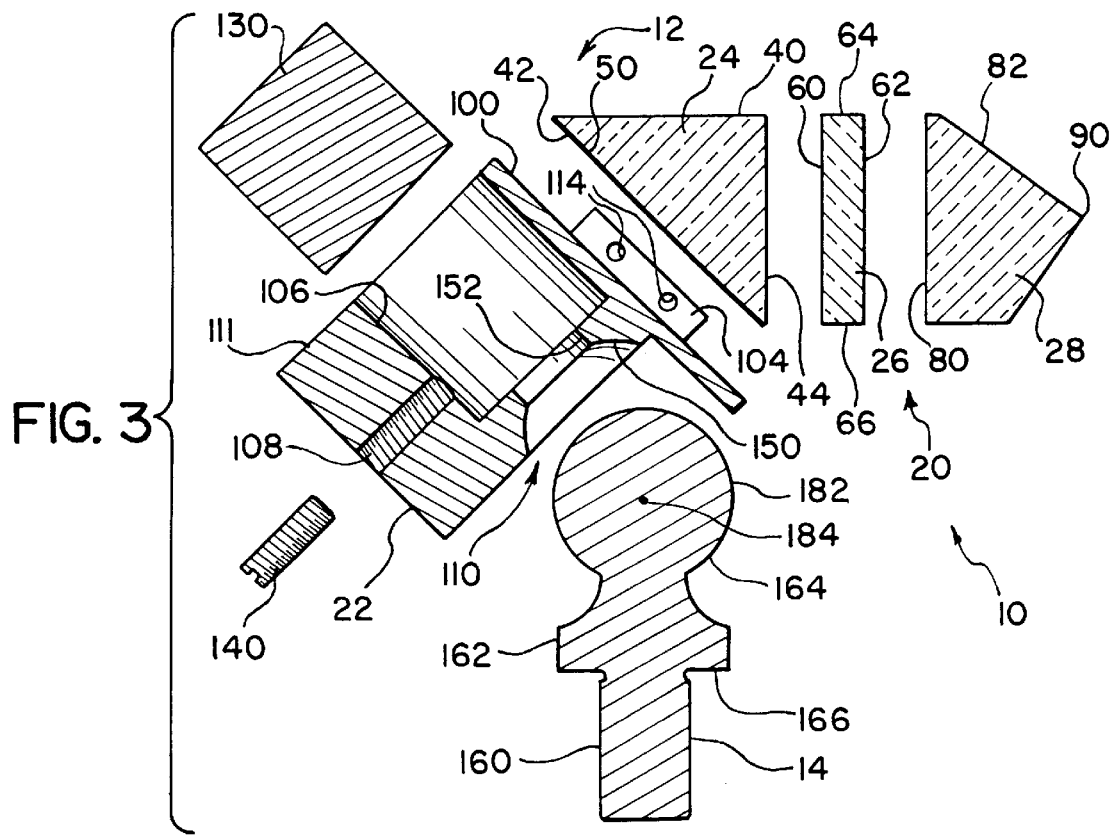
FIG. 2
FIG. 3

RETROREFLECTOR FOR USE WITH TOOLING BALL

FIELD OF THE INVENTION

The present invention generally relates to an apparatus for determining the location of a point in space. More, specifically, the present invention relates to a retroreflector that is releasably coupled to a locating device, such as a tooling ball. The retroreflector reflects a beam of light to a corner cube vertex of the retroreflector which represents the virtual location of the point to be located, for example, the center point of the sphere of the tooling ball. The location of the vertex, and thus, the location of the point is determined by an appropriate coordinate measuring device.

BACKGROUND OF THE INVENTION

The use of tooling balls rigidly secured on a mechanism is known to locate reference positions on the mechanism. Examples of such mechanisms are manufacturing equipment, robotic apertures, and devices subject to expansion or contraction where close dimensional tolerances must be maintained. Coordinate measuring machines precisely determine the position of the center of each tooling ball used. Often, these coordinate measuring machines are optical systems using lasers; such as laser trackers. Typically, a hand-held reflective device is positioned against the sphere of the tooling ball to reflect a beam of light from the laser back to the coordinate measuring machine. The reflective device is then moved manually to other locations on the sphere to again reflect a beam of light back to the coordinate measuring machine. This procedure continues until enough positions on the sphere of the tooling ball have been determined to precisely locate of the center of the sphere. The entire procedure is repeated each time it is desired to check for movement of the mechanism. Thus, determining the center of the sphere of a tooling ball in this manner is time consuming. Additionally, since the reflective device is often moved around the tooling ball by hand, the procedure is cumbersome and tiring for the users.

Attempts have been made to simplify this procedure by replacing conventional tooling balls with devices whose center is more easily determined. However, in addition to requiring the discarding of conventional tooling balls, such devices are often expensive, less durable, and/or bulky.

Examples of prior tooling ball related devices and of prior optical measuring systems are disclosed in the following U.S. Pat. Nos.: 3,188,739 to Olsen et al.; 3,730,470 to Mitchell; 4,543,729 to Holbrook; 4,621,926 to Merry et al.; 4,714,339 to Lau et al.; 4,790,651 to Brown et al.; 4,964,218 to Morghen; 5,007,175 to Schwarz; 5,073,005 to Hubbs; 5,119,564 to Hamilton et al.; 5,177,563 to Everett et al.; 5,231,539 to McMillen; 5,305,091 to Gelbart et al.; and 5,530,549 to Brown, the disclosures of which are hereby incorporated herein by reference. Another prior device and optical measuring system is disclosed in WO 95/35480 to Ehbets.

Thus, there is continuing need to provide improved devices for determining the location of a point in space, especially for determining the center of the sphere of a tooling ball.

SUMMARY OF THE INVENTION

Accordingly, it is a primary object of the invention to provide a rapid and accurate determination of the location of a point in space.

Another object of the invention is to provide a durable, compact, and relatively inexpensive device for determining the location of a point in space.

Still another object of the invention is to provide a reflective device for a hemispherical surface that is free-standing at various locations on the hemispherical surface without support from other elements.

Yet another object is to provide a retroreflector to a tooling ball for determining the center of the tooling ball with the use of a single beam of light.

The foregoing objects are basically attained by a measuring apparatus for determining the location of a point in space using a coordinate measuring device, the combination comprising a positioning member located in space and having a first point whose location is to be determined, the positioning member having an outer surface spaced from the first point; an optical member capable of receiving a beam of light from the coordinate measuring device along a path and retroreflecting the beam of light back along the path, the optical member having a predetermined dimensional relationship with the first point; and a securing member, rigidly coupled to the optical member and engagable with the outer surface of the positioning member, for releasably coupling the optical member to various places on the outer surface of the positioning member.

The foregoing objects are further attained by a method for determining the location of a point in space using a coordinate measuring device comprising the steps of releasably coupling an optical assembly in a free standing manner to an outer surface of a first positioning member located in space, the first positioning member having a first point spaced from the outer surface whose location is to be determined, the optical assembly having a known dimensional relationship with the first point; directing a first beam of light in a first direction from a coordinate measuring device generally towards the first point and onto the optical assembly; reflecting the first beam of light away from the first point and in a second direction towards a second point in space on the optical assembly which represents the virtual location of the first point; retroreflecting the first beam of light in a third direction opposite to the second direction; reflecting the first beam of light in a fourth direction opposite to the first direction generally away from the first point from the optical assembly to the coordinate measuring device; and determining the location of the first point in space using the reflected first beam of light.

The foregoing objects are still further attained by a retroreflector comprising an optical portion in the form at least one solid transparent element having an index of refraction, the optical portion having a entry surface, a first reflective surface coupled to the entry surface, and three substantially flat reflective surfaces coupled to the first reflective surface, the three substantially flat reflective surfaces being substantially perpendicular to each other and intersecting at a vertex, the vertex representing the virtual location of a first point in space, the entry surface being spaced a first distance from the first point in space; and a securing portion rigidly coupled to the optical portion for rigidly positioning the optical portion a known dimension from the first point for determining the location of the first point in space, the optical portion adapted to receive a beam of light through the entry surface and reflect the beam of light within the optical portion, the optical portion being sized and configured to enable the beam of light to travel a second distance within the optical portion from the entry surface to the vertex, the second distance being approximately the first distance multiplied by the index of refraction.

Other objects, advantages, and salient features of the invention will become apparent from the following detailed description which, taken in conjunction with the annexed drawings, discloses preferred embodiments of the invention.

BRIEF DESCRIPTION OF THE DRAWINGS

Referring now to the attached drawings which form a part of this original disclosure:

FIG. 2 is a front-side perspective view of the tooling ball retroreflector in accordance with the present invention mounted on a tooling ball;

FIG. 3 is an exploded, cross-sectional view taken along line 3—3 of FIG. 2 and showing the tooling ball retroreflector in accordance with the present invention and the tooling ball;

DETAILED DESCRIPTION OF THE INVENTION

Figure 1:
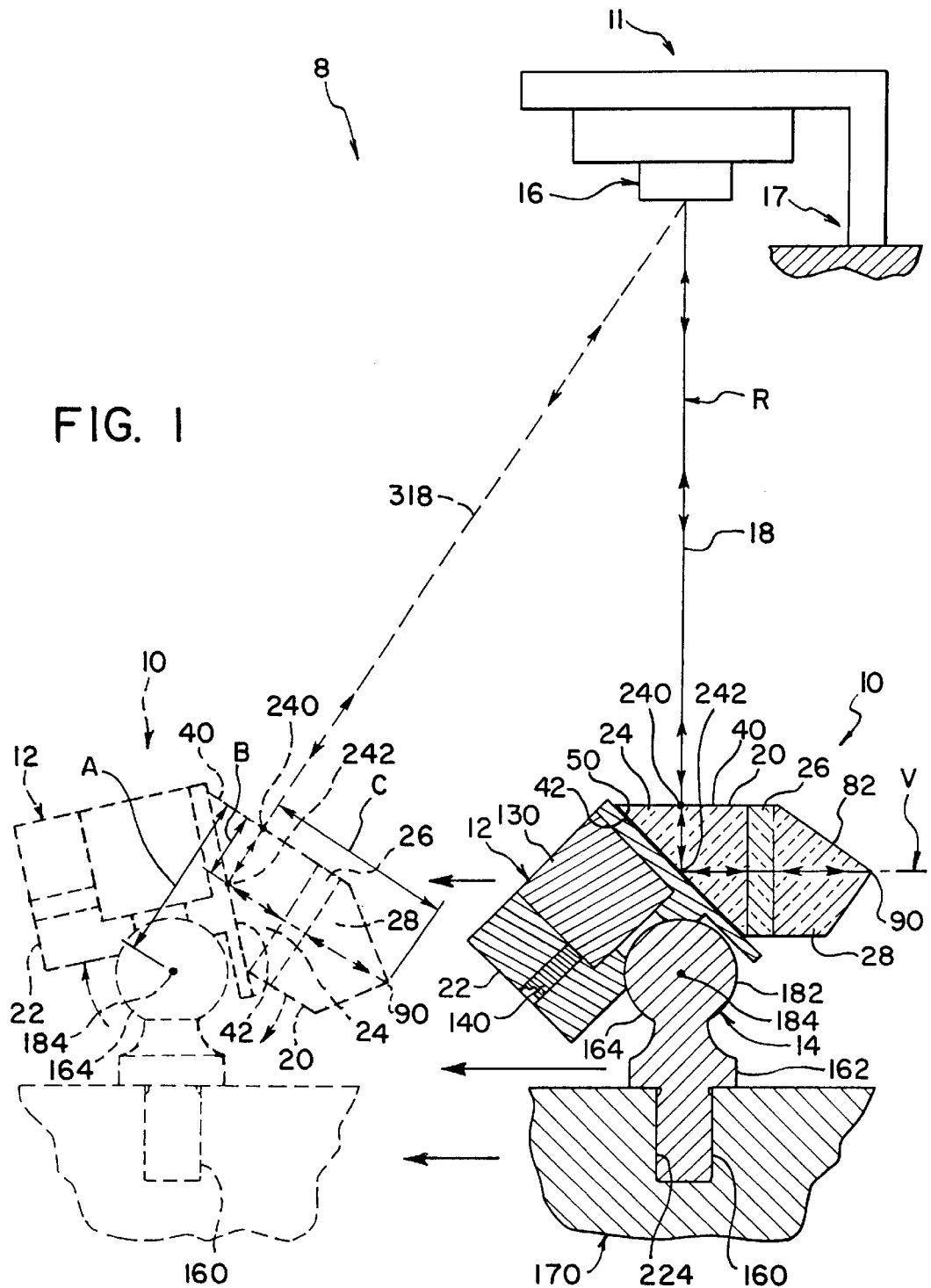
FIG. 1 is a side elevational view of a conventional coordinate measurement machine and a cross-sectional view of a retroreflector in accordance with the present invention receiving a beam of light from the coordinate measuring machine and mounted on a tooling ball which is, in turn, mounted on a mechanism whose position is being determined, and additionally illustrating in dotted lines the movement of the mechanism, the tooling ball and the retroreflector to a new position with the retroreflector being moved about the sphere of the tooling ball for alignment with the coordinate measurement machine.
Figure 4:
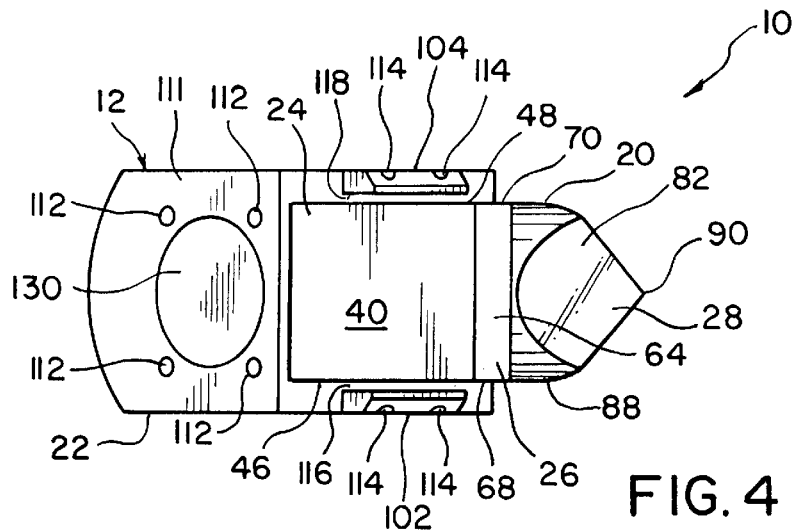
FIG. 4 is a top elevational view of the tooling ball retroreflector in accordance with the present invention.

Referring initially to FIG. 1, a measuring system 8 in accordance with the present invention is illustrated. Measuring system 8 includes a measuring apparatus 10 and a coordinate measuring machine 11. Measuring apparatus 10 includes a tooling ball retroreflector 12 mounted on a tooling ball 14. Coordinate measuring machine 11 comprises, for example, a laser tracker 16 that is attached to a known fixed reference location 17 and that produces a steerable beam of light 18 along an R axis.

Referring to FIGS. 2–6, tooling ball retroreflector or retroreflector 12 has an optical portion 20 and a securing portion 22. Optical portion or optical member 20 is formed of a right angle prism 24, a flat plate 26, and a corner cube 28. These three elements 24, 26 and 28 are made of a transparent material with a known index of refraction. Preferably, elements 24, 26 and 28 are made of glass and have an index of refraction of approximately 1.5.

Right angle prism 24 is a single, unitary piece of transparent material which is shaped like a wedge. Right angle prism 24 has an entry surface 40, a mounting surface 42, an attaching surface 44 and two parallel adhering surfaces 46 and 48. All surfaces 40, 42, 44, 46 and 48 are substantially flat and planar. Entry surface 40 is perpendicular to attaching surface 44 and adhering surfaces 46 and 48. Entry surface is the surface of right angle prism 24 through which beam of light or beam 18 enters right angle prism 24 as discussed below.

Mounting surface 42 is inclined with respect to entry surface 40 and mounts right angle prism 24 on securing portion 22 as discussed below. Mounting surface 42 is provided with a reflective coating 50 facing inwardly toward right angle prism 42 so that beam 18 is completely reflected off mounting surface 42 after entering right angle prism 24 and reflected towards corner cube 28 as discussed below.

Attaching surface 44 is substantially perpendicular to entry surface 40 and to adhering surfaces 46 and 48 and attaches to flat plate 26 as discussed below. Adhering surfaces 46 and 48 are each substantially perpendicular to entry surface 40 and attaching surface 44 and attach to securing portion 22 as discussed below.

Flat plate 26 has substantially parallel attaching surfaces 60 and 62, substantially parallel top and bottom 64 and 66, and substantially parallel sides 68 and 70. All of the surfaces 60, 62, 64, 66, 68 and 70 are substantially flat and planar surfaces. Attaching surfaces 60 and 62 are substantially perpendicular to all other surfaces of flat plate 26. Attaching surface 60 is the location of the attachment between flat plate 26 and right angle prism 24 and attaching surface 62 is the location of the attachment between flat plate 26 and corner cube 28.

Attaching surface 60 abuts and mates with attaching surface 42 of right angle prism 24 in a flush manner and is rigidly connected thereto. Attaching surface 60 is connected to attaching surface 44 in any conventional manner that will permit flat plate 59 and right angle prism 24 to function as intended and as discussed below. The connection between attaching surfaces 60 and 44 must enable beam 18 to pass through flat plate 59 after being reflected off mounting surface 42 and after being retroreflected of corner cube 28 as discussed below. Preferably, the attachment between attaching surfaces 60 and 44 is made by an adhesive; such as epoxy as is known in the art. Alternatively, the attachment can be made using a conventional mechanical attachment, such as clamps or screws.

Top 64 and bottom 66 of flat plate 26 are each perpendicular to each side 68 and 70. Top and bottom 64 and 66 and sides 68 and 70 represent the width of flat plate 26 and are free of attachment to other elements.

Corner cube 28 has an attaching surface 80, three reflective surfaces 82, 84 and 86, and a curved side surface 88. Attaching surface 80 is substantially flat and mates with attaching surface 62 of flat plate 26 in a substantially flush manner. Attaching surface 80 is rigidly coupled to attaching surface 62 of flat plate 26 in a similar manner as attaching surface 60 of flat plate 26 is coupled to attaching surface 44 of right angle prism 24. Attaching surface 80 allows beam 18 to pass from flat plate 26 to within corner cube 28.

Reflective surfaces 82, 84 and 86 are all substantially flat surfaces that are substantially perpendicular to each other, intersecting at a vertex 90. Reflective surfaces 82, 84 and 86 and, thus, vertex 90 are arranged and configured as discussed below That is, reflective surfaces 82, 84, and 86 are positioned to receive beam 18 after it reflects off mounting surface 42 at vertex 90 and to retroreflect beam 18 back to mounting surface 42 along the same path it took after originally being reflected off mounting surface 42. Reflective surfaces 82, 84 and 86 allow total internal reflection of beam 18 and therefore, do not have a reflective coating thereon. However, if desired, reflective surfaces 82, 84 and 86 can be provided with reflective coatings. Side surface 88 extends between each of reflective surfaces 82, 84 and 86 and attaching surface 80 and is unattached to any other element.

It should be understood that although optical portion 20 has been disclosed as comprising three distinct elements that are rigidly coupled together, optical portion 20 can be made of various numbers of elements in various configurations. For instance, right angle prism 24, flat plate 26, and corner cube 28 can be replaced with an optical portion which reflects or refracts beams of light an additional number of times or which has changed the angles of reflection of beam 18 through optical portion 20. Further, optical portion 20 can be constructed as a one-piece, unitary member.

Securing portion 22 has an attaching surface 100, two parallel aligning extensions 102 and 104, a main bore 106, a threaded bore 108, a mounting portion 110, and four fixturing holes 112. Securing portion 22 is generally cube-shaped and made from metallic material; such as steel. Securing portion 22 is preferably made from a single, unitary piece of material, however, it can be formed from any number of separate, but rigidly connected elements.

Figures 5, 6:
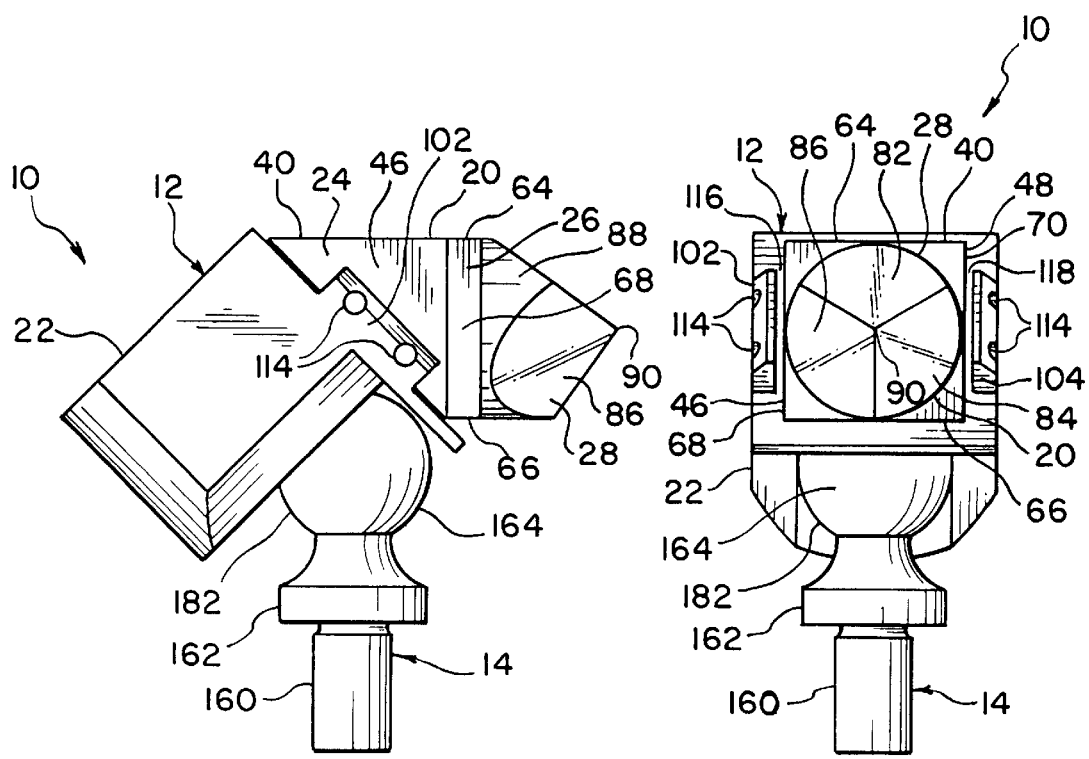
FIG. 5 is a side elevational view of the tooling ball retroreflector in accordance with the present invention mounted on a tooling ball.
FIG. 6 is a front elevational view of the tooling ball retroreflector in accordance with the present invention mounted on a tooling ball.

Attaching surface 100 is substantially flat and planar and is rigidly coupled to mounting surface 42 of right angle prism 24 in a substantially flush, mating manner. Attaching surface 100 and mounting surface 42 are rigidly coupled together in a conventional manner, preferably by an adhesive; such as epoxy. Attaching surface 100 has a width and length which are larger than that of mounting surface 42 to fully attach thereto. Extensions 102 and 104 extend substantially perpendicularly from opposing sides of attaching surface 100 and project away from attaching surface 100 to form a U-shaped member with attaching surface 100 for receiving right angle prism 24. Additionally, each extension 102 and 104 is sufficiently thick to remain spaced from right angle prism 24 as illustrated in FIG. 6. More specifically, a gap 116 is located between adhering surface 46 of right angle prism 24 and extension 102. Likewise, a gap 118 exists between adhering surface 48 of right angle prism 24 and extension 104. Each extension 102 and 104 has two adhesive holes 114 extending completely therethrough.

During the mounting of right angle prism 24 on attaching surface 100 of securing portion 22, right angle prism 24 is placed between extensions 102 and 104. Adhesive is then inserted through adhesive holes 114 to fill a portion of each gap 116 and 118 as necessary to create an adhesive bond between adhering surfaces 46 and 48 and extensions 102 and 104, respectively. Gaps 116 and 118 allow right angle prism 24 and, thus, optical portion 20 to move relative to securing portion 22 prior to the formation of a rigid connection therebetween. This enables optical portion 20 to be accurately and precisely aligned with respect to securing portion 22 to perform the necessary functions discussed below. Therefore, optical portion 20 is rigidly connected to securing portion 22 between extensions 102 and 104 and adhering surfaces 46 and 48, respectively, as well as between attaching surface 100 and mounting surface 42. Preferably, these three points of rigid attachment are formed by an adhesive; such as epoxy. However, convention mechanical connections may be employed, such as clamps or screws.

Main bore 106 is preferably a substantially circular bore that extends through a majority of securing portion 22 and is sized to fully receive a magnet 130 having substantially the same dimensions as main bore 106 as discussed below. Threaded bore 108 is sized to threadedly receive a set screw 140 which securely maintains magnet 130 within main bore 106.

Mounting portion 110 comprises an annular concave surface 150 that is a portion of a hemisphere. Mounting portion 110 has an opening 152 extending through the center of annular concave surface 150 to main bore 106. In other words, opening 152 extends from annular concave surface 150 to main bore 106 to provide, with main bore 106, a passageway extending completely through securing portion 22 when securing portion 22 is not attached to tooling ball 14 and magnet 130 is not positioned in main bore 106. Annular concave surface 150 is shaped to mate with tooling ball 14 as discussed below. Opening 152 enables a less than perfect fit between annular concave surface 150 and tooling ball 14 and provides a narrow gap between magnet 130 and tooling ball 14 when securing portion 22 is mounted on tooling ball 14. The radius of curvature of concave surface 150 is substantially the same as the radius of tooling ball 14.

Fixturing holes 112 are arranged symmetrically around main bore 106 and extend into securing portion 22 from fixturing surface 111. Fixturing holes 112 are threaded, closed-end openings which permit securing portion 22 to be securely held by a fixturing device, such as a clamp, while optical portion 20 is being positioned on and connected to securing portion 22.

Tooling ball 14 has a shank 160, a shoulder 162, and a sphere 164. Tooling ball 14 is a conventional tooling ball that is known in the art and therefore will only be described briefly herein. Tooling ball 14 is preferably formed as a unitary, one-piece member and made of a solid piece of metallic material; such as steel.

Shank 160 is cylindrical and extends away from shoulder 162 a length sufficient for insertion into a mechanism 170 as illustrated in FIG. 1 and to form a secure connection with mechanism 170. Shoulder 162 projects annularly around shank 160 and has an abutting surface 166 for mating with mechanism 170 in a substantially flush manner. Sphere 164 is rigidly connected to shank 160 and shoulder 162 and has a substantially smooth outer surface 182 and a center point 184. Sphere 164 is typically 0.50 inch in diameter, thus, for such a typical tooling ball 14, center point 184 is spaced 0.25 inch from outer surface 182. When securing portion 22 is attached to tooling ball 14 as illustrated in FIG. 1, outer surface 182 and annular concave surface 150 of securing portion 22 are mating surfaces that are substantially flush with each other.

Retroreflector 12 and tooling ball 14 are attached to each other through the connection of securing portion 22 and outer surface 182 of sphere 164. When magnet 130 is securely positioned within main bore 106 as illustrated in FIG. 1, a magnetic force is produced which extends through securing portion 22 to annular concave surface 150 to attract sphere 164. Additionally, a magnetic force extends directly from magnet 130 through opening 152 to sphere 164. Magnet 130 and its magnetic force have the effect of securely coupling retroreflector 12 to tooling ball 14 in a free-standing, releasable manner. In other words, annular concave surface 150 of retroreflector 12 can be placed anywhere on outer surface 182 of sphere 164 and the magnetic force produced by magnet 130 and the attraction between magnet 130 and tooling ball 14 will rigidly maintain retroreflector 12 on tooling ball 14 in the selected position without additional support or attachment between retroreflector 12 and tooling ball 14.

Thus, a user can place retroreflector 12 on tooling ball 14 at any desired orientation around sphere 164 and release retroreflector 12 without retroreflector 12 changing position. However, the magnetic force produced by magnet 130 still enables the user to smoothly rotate retroreflector 12 along outer surface 182 of sphere 164 to a new position which is rigidly maintained in a free-standing manner as illustrated in dotted lines in FIG. 1. Alternatively, the magnetic force of magnet 130 enable a user to completely remove retroreflector 12 from tooling ball 14 for later attachment to the same or another tooling ball 14. Accordingly, the size and specific characteristics of magnet 30 will depend upon the size of retroreflector 12 and of tooling ball 14. Additionally, although magnet 130 has been illustrated as being substantially cylindrical, magnet 130 can take any convenient shape or form.

It should be understood that although the method of securing retroreflector 12 to tooling ball 14 has been disclosed as employing the use of magnet 130, other securing methods that adequately attach retroreflector 12 to tooling ball 14 that can function in a manner similar to that described above with respect to magnet 130 can be employed. For instance, a mechanical connection can be made between securing portion 20 and sphere 164. More specifically, one or more removable fasteners, such as screws, can be used to removably, rigidly clamp a portion of retroreflector 12 against sphere 164.

Coordinate measuring machine 11 is any conventional, known coordinate measuring device employing a laser and, therefore, will not be described in detail herein. For instance, coordinate measuring machine 11 can be a laser tracker having a distance measuring ability, an angle measuring ability, and a tracking function that keeps the laser on the target. Generally, there are two types of laser-based coordinate measuring machines or laser trackers that are preferably used with measuring system 8: those whose radial distance measurements are made by means of relative distance meters and those whose radial distance measurements are made by means of absolute distance meters.

The most common type of relative distance measuring system is the fringe-counting laser interferometer. In this type of system, a reference beam and measurement beam interfere either constructively or destructively according to the distance from the coordinate measuring machine to the retroreflecting target. By counting the number of fringes that occur as the target is moved toward or away from the coordinate measuring machine, the distance to the retroreflecting target can be calculated. With a relative distance meter, if the path from the coordinate measuring machine to the retroreflecting target is broken for any reason, all information about the distance from the coordinate measuring machine to the target is lost. It is then necessary to move the retroreflecting target to a reference position whose distance relative to the coordinate measuring machine has been established previously. Consequently, if a relative distance meter is used with retroreflector 12, it is necessary to track retroreflector 12 from a reference position, to tooling ball 14, and to another tooling ball 314 if the user desires to determine the coordinates of more than one tooling ball.

Examples of tracking laser interferometers that can measure X, Y and Z coordinates to locate a point in space and be used with the present invention are disclosed in U.S. Pat. No. 5,530,549 to Brown and U.S. Pat. No. 4,790,651 to Brown et al., the disclosures of which are hereby incorporated herein by reference. It should be understood that instead of an interferometer system, the coordinate measuring machine 11 can use any other distance measuring technology which employs light and functions by comparing the returning beam of light with the outgoing beam of light.

In contrast, although an absolute distance meter can function in a manner similar to that described above with respect to the relative distance meter, an absolute distance meter can measure the absolute distance to a target directly from the information received from a single "shot" from the laser. Thus, an absolute distance meter does not require the use of information gathered from a reference position and require the target to be constantly tracked from the reference position.

There are a variety of methods for implementing an absolute distance meter. The preferred method is based on the principle of the "time of flight". More specifically, the preferred method determines the phase shift of intensity modulated light from a semiconductor laser. Regardless of the method of implementing an absolute distance meter, however, the important characteristics of an absolute distance meter is that it continues to provide accurate distance from the coordinate measuring machine to the retroreflecting target even after the path from the coordinate measuring machine to the target is broken. Consequently, with an absolute distance meter, beam 18 from coordinate measuring machine 11 can be directed to any number of retroreflectors 14 and 314 without the necessity of tracking the relative movement of beam 18 from one retroreflector 14 to another retroreflector 314. Hence, retroreflector 12 is especially beneficial when used in conjunction with absolute distance measuring systems.

Measuring apparatus 10 including retroreflector 12 and tooling ball 14, is positioned on mechanism 170 in order to determine the exact location of a portion of mechanism 170 and to determine the movement or the lack of movement of that portion. Mechanism 170 has a cylindrical opening 224 therein sized to snugly and rigidly receive shank 160 of tooling ball 14. Through the use of tooling ball 14 and retroreflector 12, the portion of mechanism 170 adjacent tooling ball 14 can be precisely located and any movement thereof determined.

Since the connection between tooling ball 14 and mechanism 170 is a rigid connection having a known dimensional relationship, determining the location of center point 184 of sphere 164 will effectively locate a portion of mechanism 170. Thus, once tooling ball 14 is attached to mechanism 170, it is center point 184 of sphere 164 which becomes the point in space whose location is determined and whose movement is determined.

Operation

Retroreflector 12 is positioned on sphere 164 of tooling ball 14 as illustrated in FIG. 1. Coordinate measuring machine 11 is positioned so that beam 18 emanating from laser tracker 16 is directed towards center point 184 of sphere 164 and so that beam 18 and its axis R are perpendicular to entry surface 40. Beam 18 enters right angle prism 24 at entry point 240 and continues therethrough to reflection point 242 on mounting surface 42. Optical portion 20 is configured to enable beam 18 to then reflect off mounting surface 42 and proceed along axis V to vertex 90 of corner cube 28. Beam 18 then retroreflects off corner cube 28 from vertex 90 back towards reflection point 242 on mounting surface 42 along the same path. That is, beam 18 proceeds back to reflection point 242 along axis V. Beam 18 then reflects again off mounting surface 42 and proceeds back to laser tracker 16 in coordinate measuring machine 11 along the same path beam 18 originally took from coordinate measuring machine 11. That is, beam 18 returns to coordinate measuring machine 11 along axis R. If beam 18 is not perpendicular to entry surface 40 when it enters right angle prism 24, beam 18 will be refracted as it passes into right angle prism 24 and still be reflected off mounting surface 42 and retroreflected off vertex 90. Additionally, when an absolute distance meter is employed, the laser tracker will perform a search routine to locate the position of vertex 90 if it is not initially found. Thus, slightly varying the exact positioning of laser tracker 16 and retroreflector 12 is permitted.

Coordinate measuring machine 11 is capable of determining the position of center point 184 of sphere 164 through the above-described technique since vertex 90 represents the virtual location of center point 184. This is accomplished by accurately sizing and configuring retroreflector 12 for a specific size tooling ball 14. In other words, a predetermined dimensional relationship exists between vertex 90 and center point 184.

Ideally, beam 18 would continue unimpeded by physical structures from laser tracker 16 to center point 184 and then return to laser tracker 16 to determine the precise location of center point 184. Since this is not possible with the use of a conventional tooling ball, retroreflector 12 enables center Point 184 to be represented virtually at vertex 90. Thus, the distance to center point 184 can be found by determining the distance to vertex 90.

Right angle prism 24 is generally oriented to position entry surface 40 for perpendicularly receiving beam 18. Coordinate measuring machine 11 is adjusted to cause the projection of beam 18 to intersect center point 184 of sphere 164. In other words, coordinate measuring machine 11 is adjusted so that if beam 18 was to travel unimpeded by physical structures, i.e., travel through air, it would intersect center point 184. Also, right angle prism 24, flat plate 26, and corner cube 28 are sized and configured so that the optical path length of beam 18 through optical portion 20 from entry point 240 to reflection point 242 and from reflection point 242 to vertex 90 is substantially, effectively equivalent to the imaginary optical path length of beam 18, through only air, from entry point 240 to center point 184 of sphere 164. Substantially, effectively equating the optical path length through optical portion 20 with the imaginary optical path length through air allows vertex 90 to accurately represent center point 184. The location coordinates of center point 184 can than be determined from the coordinate measuring machine 11 measurements of, for example, radial distance, azimuth angle, and elevational angle, or merely three radial distances.

The necessary optical path length through optical portion 20, or the combined length of distance B and C illustrated in FIG. 1, to accurately virtually represent center point 184 on vertex 90 is determined by multiplying the imaginary optical path length through air from entry point 240 to center point 184, or the distance A illustrated in FIG. 1, by the index of refraction of optical portion 20. In other words, the distance from entry point 240 to reflection point 242 plus the distance from reflection point 242 to vertex 90 is configured to be approximately equal to the distance from entry point 240 to center point 184 multiplied by the index of refraction of optical portion 20.

Preferably optical portion 20 is formed of glass, such as BK7 glass, which has an index of refraction of 1.51509 at a wavelength of 632.8 nm which is typical for a helium-neon laser. As an example, if BK7 glass is used along with a standard tooling ball 14 with a 0.50 inch diameter sphere 164, the distance A from entry point 240 to center point 184 is approximately 0.754 inch, the distance B from entry point 240 to reflection point 242 is approximately 0.295 inch, and the distance C from reflection point 242 to vertex 90 is approximately 0.854 inch. Additionally, the distance from entry surface 40 to the center of the corner cube 28 is mechanically adjustable by 0.05 inch, and the distance from entry surface 40 to center 184 of sphere 164 can be adjusted over the range of 0.754 to 0.759 inch.

Although optical portion 20 has been described as being formed of solid elements including a solid corner cube, optical portion 20 can be formed as a series of mirrors, specifically, a single mirror and an open air corner cube formed of three perpendicular mirrors. Therefore, beam 18 would travel only through air for the exact distance it would travel to center point 184 through air. Such an open air optical portion is described in U.S. Pat. No. 5,530,549 to Brown, the disclosure of which is hereby incorporated by reference as stated above.

In use, measuring apparatus 10 has a number of ways in which it can be employed together with coordinate measuring machine 11. For instance, retroreflector 12 can be used on a single tooling ball 14 to determine the location of center point 184 in an initial position as illustrated in solid lines in FIG. 1. Then, if tooling ball 14 and mechanism 170 move, the new position of center point 184 can be determined.

If a laser tracker 16 is used to track retroreflector 12, either using a relative distance meter or an absolute distance meter, retroreflector 12 is placed at a reference location so that laser tracker 16 can determine the distance to vertex 90. Laser tracker 16 then maintains its laser beam constantly centered on vertex 90 while retroreflector 12 is moved to and placed on tooling ball 14 as illustrated in FIG. 1 and the position of center point 184 is determined. Beam 18 of laser tracker 16 is constantly centered on vertex 90 during any movement of retroreflector 12 and tooling ball 14 for as long as center point 184 is tracked. Thus, any changes in position of center point 184 can be determined.

When using a laser tracker 16 with an absolute distance meter, the initial position of center point 184 can be determined as illustrated in FIG. 1 with the use of a single "shot" of laser beam 18 from laser tracker 16 reflecting off vertex 90. To determine the change of position, if any, of center point 184, a second "shot" of laser beam 18 is used. Generally, the movement of center point 184 is sufficiently small that no realignment of retroreflector 12 or laser tracker 16 is necessary.

However, for various reasons, laser tracker 16 and/or mechanism 170 may be moved to such an extent that they must be realigned with respect to each other. In other words, retroreflector 12 and/or laser tracker 16 may need to be realigned to enable a beam 318 to enter optical portion 20 through entry surface 40 in a substantially perpendicular manner. If retroreflector 12 needs to be realigned, it is simply manually rotated about outer surface 182 of sphere 164 to its desired orientation with respect to outer surface 182 and coordinate measuring machine 11. Also, beam 18 from laser tracker 16 can be directed, i.e., steered, towards the new position of retroreflector 12 while maintaining its reference location 17 as is known in the art. Laser tracker 16 can then send a second beam 318 to retroreflector 12 and then receive beam 318 after it is retroreflected off vertex 90 for determining the location of center point 184 as previously described. Thus, this new position of center point 184 can be determined.

Figure 7:
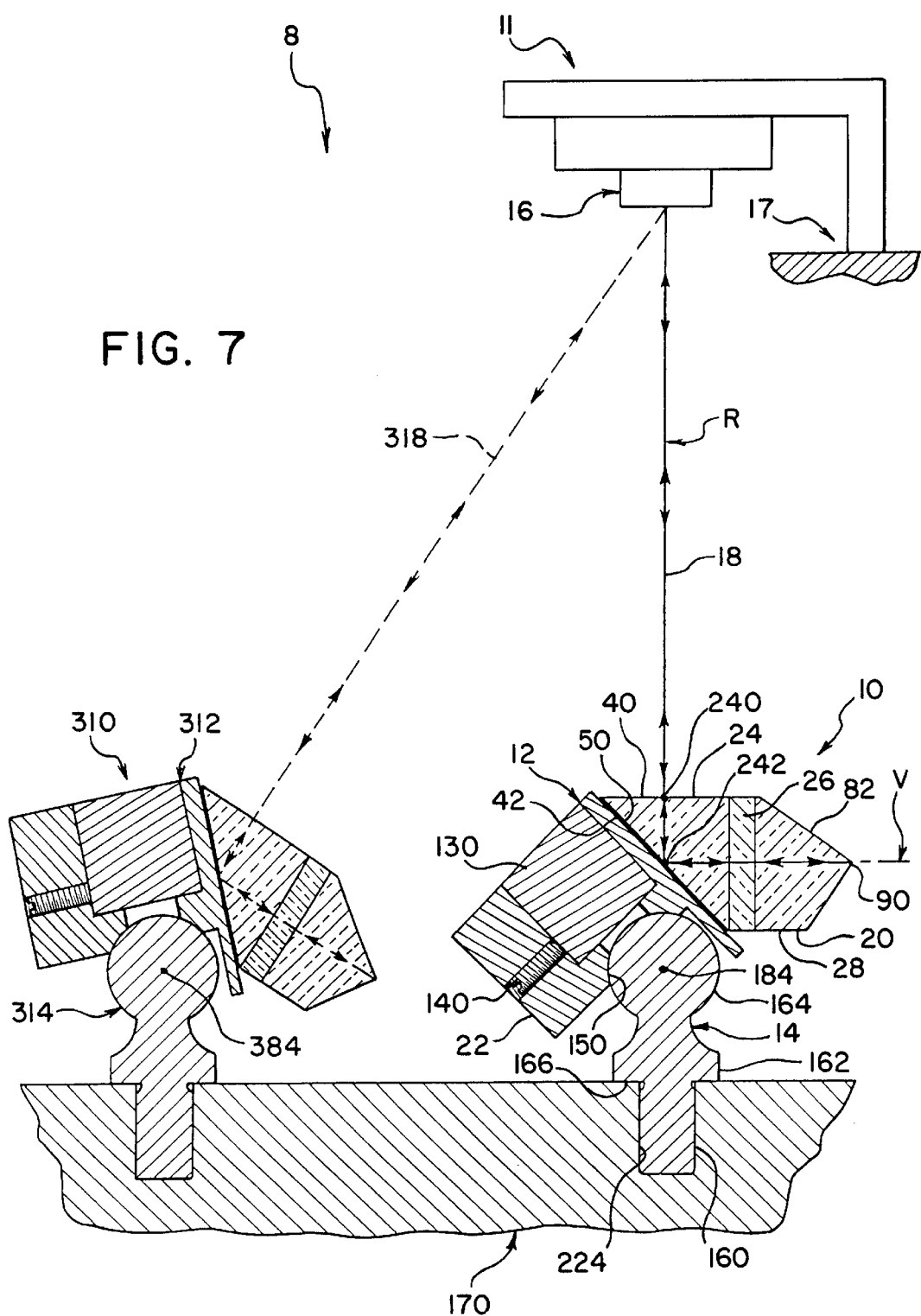
FIG. 7 is a side elevational view of the coordinate measuring machine and a cross-sectional view of two tooling ball retroreflectors in accordance with the present invention, each receiving a beam of light from the coordinate measuring machine and each mounted on a tooling ball which is, in turn, mounted on the mechanism whose position is being determined.

As seen in FIG. 7, a second measuring apparatus 310 having a tooling ball 314 and a retroreflector 312 can be used together with measuring apparatus 10 on a single mechanism 170 to determine the location of various points on mechanism 170 by determining the location of their respective center points 384 and 184. Second measuring apparatus 310 is substantially identical to measuring apparatus 10. Using a laser tracker 16 employing an absolute distance meter, after laser tracker 16 has determined the position of center point 184 from beam 18 as illustrated in solid lines in FIG. 7 and as discussed above, laser tracker 16 is turned to center point 384 of tooling ball 314. Then a second beam 318 is sent to retroreflector 312 to determine the location of center point 384 of the second tooling ball 14 as illustrated in dotted lines in FIG. 7. Second measuring apparatus 310 functions in a substantially identical manner as measuring apparatus 10 and therefore, with not be discussed in detail.

Although only two measuring apparatus 10 and 310 are illustrated, it should be understood that any number of measuring apparatus can be employed at any location of the mechanism.

Figure 8:
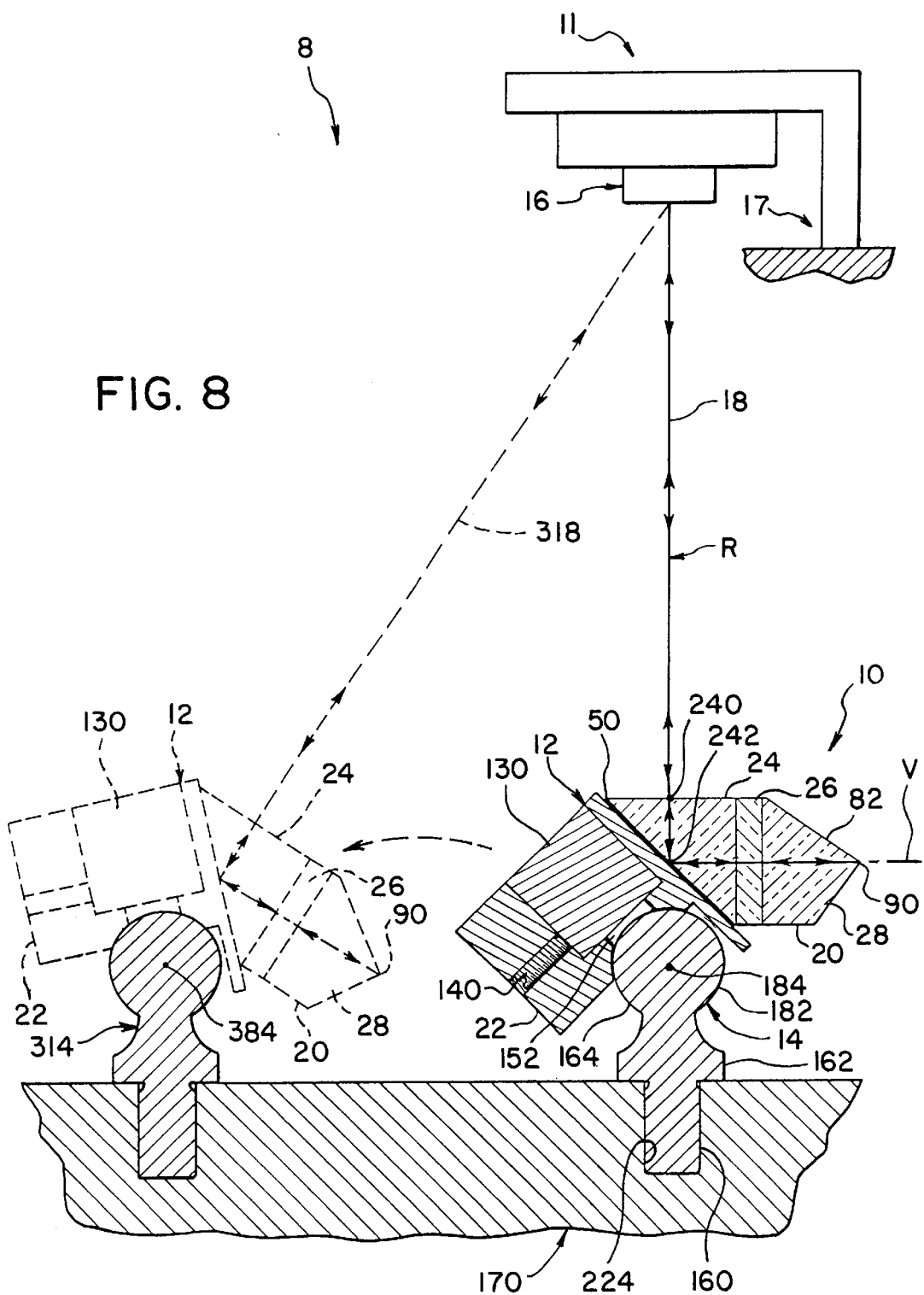
FIG. 8 is a side elevational view of the coordinate measuring machine and a cross-sectional view of a tooling ball retroreflector in accordance with the present invention receiving a beam of light from the coordinate measuring machine and mounted on a tooling ball which is, in turn, mounted on the mechanism whose position is being determined, and additionally illustrating a second tooling ball that is capable of receiving the tooling ball retroreflector after it is finished with the first tooling ball, as illustrated in dotted lines.

Referring to FIG. 8, since retroreflector 12 is releasably coupled to tooling ball 14, one retroreflector 12 can be used with multiple tooling balls 14 and 314. If it is desired to use a laser tracker 16 to track vertex 90 of retroreflector 12 employing either a relative distance meter or an absolute distance meter, the location of center point 184 is determined after locating retroreflector 12 at a reference point as discussed above. Retroreflector 12 can then be moved to and placed on tooling ball 314 as illustrated in dotted lines in FIG. 8, with the beam from laser tracker 16 constantly being centered on vertex 90 during the move from tooling ball 14 to tooling ball 314. Once retroreflector 12 is placed on tooling ball 314, the center point 384 can be determined as discussed above. This process can be repeated for any additional tooling balls.

If a laser tracker 16 employing an absolute distance meter is used, after the position of center point 184 of tooling ball 14 is determined by laser tracker 16 using beam 18 as discussed above, retroreflector 12 can be removed from tooling ball 14 and placed on second tooling ball 314 and aligned with laser tracker 16 as previously discussed. The beam from laser tracker 16 does not need to track the movement of retroreflector 12. The placement of retroreflector 12 on tooling ball 314 is illustrated in dotted lines on FIG. 8. Then a second beam 318 is transmitted by laser tracker 16 towards the center point 384 of second tooling ball 314 to determine the location of center point 384 in a manner which is substantially identical to the manner of determining the location of center point 184 as discussed above.

Although FIG. 8 has only illustrated retroreflector 12 being used with two tooling balls 14 and 314, retroreflector 12 can be used with any number of tooling balls.

While advantageous embodiments have been chosen to illustrate the invention, it will be understood by those skilled in the art that various changes and modifications can be made therein without departing from the scope of the invention as defined in the appended claims.

What is claimed is:

1. A measuring apparatus for determining the location of a point in space using a coordinate measuring device, the combination comprising:

a positioning member located in space and having a first point whose location is to be determined, said positioning member having an outer surface spaced from said first point;

an optical member capable of receiving a beam of light from the coordinate measuring device along a path and retroreflecting the beam of light back along the path, said optical member having a predetermined dimensional relationship with said first point; and a securing member, rigidly coupled to said optical member and engagable with said outer surface of said positioning member, for releasably coupling said optical member to various places on said outer surface of said positioning member.

2. A measuring apparatus according to claim 1, wherein said outer surface of said positioning member is convex.

3. A measuring apparatus according to claim 2, wherein said outer surface of said positioning member is at least substantially hemispherical.

4. A measuring apparatus according to claim 3, wherein said outer surface of said positioning member is substantially spherical.

5. A measuring apparatus according to claim 4, wherein said positioning member is a tooling ball.

6. A measuring apparatus according to claim 1, wherein said optical member has three substantially flat surfaces that are substantially perpendicular to each other and intersect at a vertex.

7. A measuring apparatus according to claim 6, wherein said vertex represents the virtual location of said first point.

8. A measuring apparatus according to claim 7, wherein said positioning member includes a substantially spherical element, and said first point is the center of said substantially spherical element.

9. A measuring apparatus according to claim 7, wherein said three flat surfaces form part of a corner cube.

10. A measuring apparatus according to claim 9, wherein said corner cube is formed of a single piece of glass.

11. A measuring apparatus according to claim 1, wherein said securing member comprises a magnet.

12. A method for determining the location of a point in space using a coordinate measuring device comprising the steps of releasably coupling an optical assembly in a free standing manner to an outer surface of a first positioning member located in space, the first positioning member having a first point spaced from the outer surface whose location is to be determined, the optical assembly having a known dimensional relationship with the first point;

directing a first beam of light in a first direction from a coordinate measuring device generally towards said first point and onto the optical assembly;

reflecting the first beam of light away from the first point and in a second direction towards a second point in space on the optical assembly which represents the virtual location of the first point;

retroreflecting the first beam of light in a third direction opposite to the second direction;

reflecting the first beam of light in a fourth direction opposite to the first direction generally away from the first point from the optical assembly to the coordinate measuring device; and determining the location of the first point in space using the reflected first beam of light.

13. A method for determining the location of a point in space using a coordinate measuring device according to claim 12, wherein the step of determining the location of the first point in space is accomplished through the use of an absolute distance meter.

14. A method for determining the location of a point in space using a coordinate measuring device according to claim 12, wherein the step of determining the location of the first point in space is accomplished through the use of a relative distance meter.

15. A method for determining the location of a point in space using a coordinate measuring device according to claim 12, further comprising the step of directing a second beam of light from the coordinate measuring device generally towards the first point to determine the location of the first point.

16. A method for determining the location of a point in space using a coordinate measuring device according to claim 12, further comprising the step of moving the optical assembly along the outer surface of the first positioning member to realign the optical assembly with the coordinate measuring device after a movement of either the first point or the coordinate measuring device with respect to each other.

17. A method for determining the location of a point in space using a coordinate measuring device according to claim 16, further comprising the step of directing a second beam of light from the coordinate measuring device generally towards the first point to determine the location of the first point.

18. A method for determining the location of a point in space using a coordinate measuring device according to claim 12, further comprising the step of removing the optical assembly from the first positioning member and attaching the optical assembly to a second positioning member having a third point whose location is to be determined.

19. A method for determining the location of a point in space using a coordinate measuring device according to claim 18, further comprising the steps of directing a second beam of light from the coordinate measuring device generally towards the third point for determining the location of the third point.

20. A method for determining the location of a point in space using a coordinate measuring device according to claim 12, further comprising the steps of directing a second beam of light from the coordinate measuring device generally towards a third point of a second positioning member for determining the location of the third point.

21. A method for determining the location of a point in space using a coordinate measuring device according to claim 20, wherein the first and second positioning members are tooling balls.

22. A method for determining the location of a point in space using a coordinate measuring device according to claim 12, wherein the first positioning member is a tooling ball.

* * * * *